Figure 1:
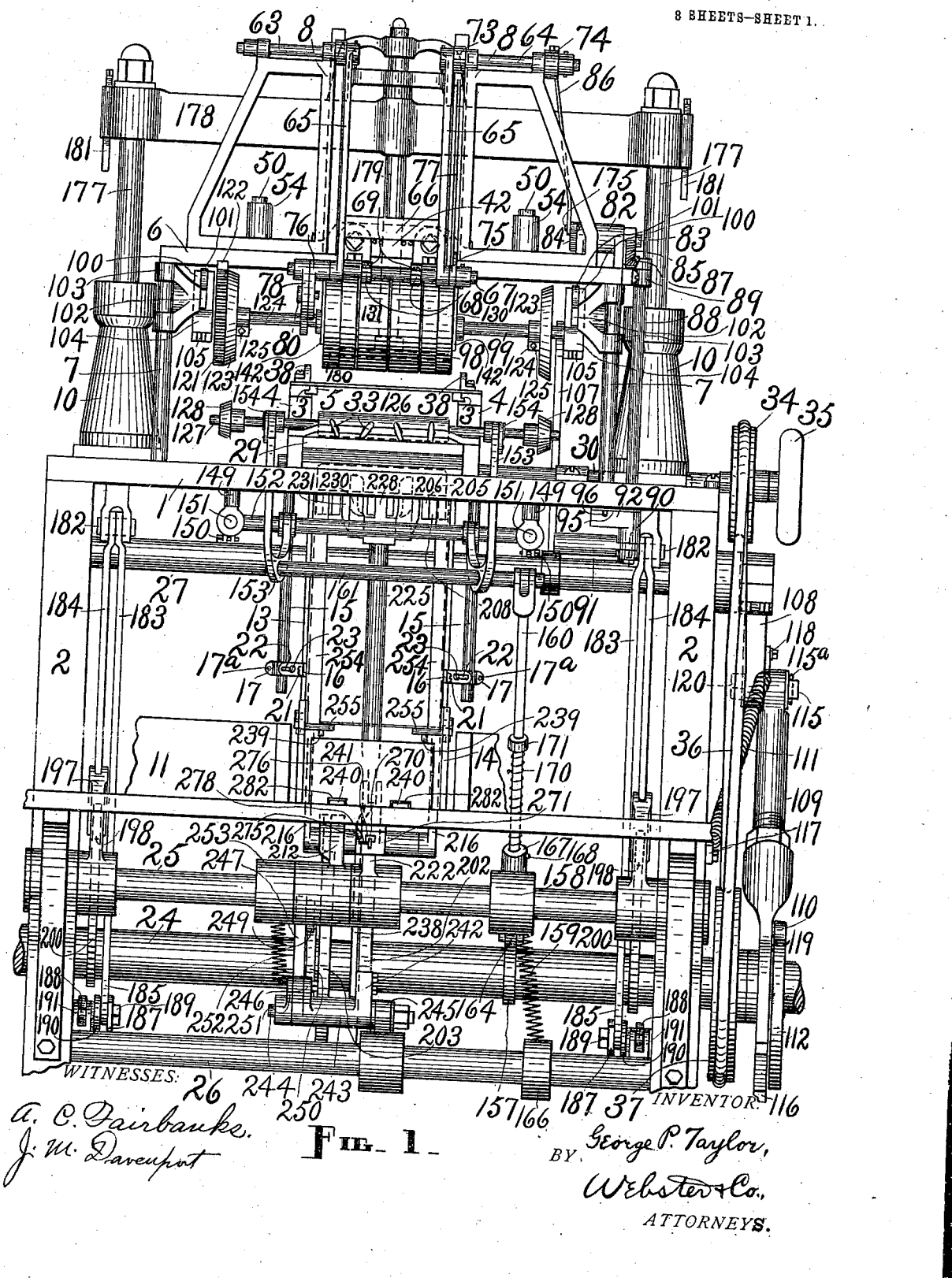

G. P. TAYLOR.
ENVELOP MACHINE.
APPLICATION FILED OCT. 13, 1909.

977,758.

Patented Dec. 6, 1910.

8 SHEETS—SHEET 2.

WITNESSES:
A. C. Fairbanks.
J. M. Davenport.

INVENTOR.
George P. Taylor,
BY Webster & Co.
ATTORNEYS.

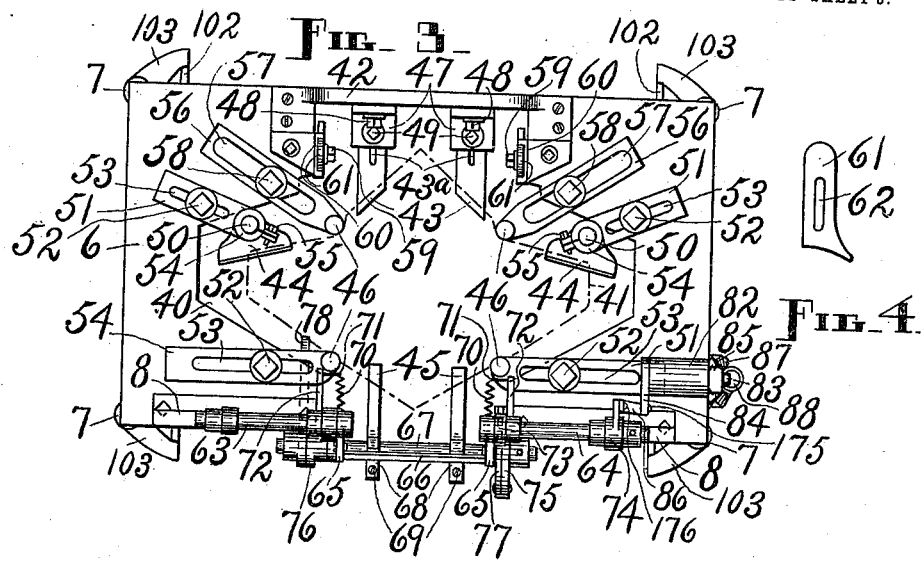
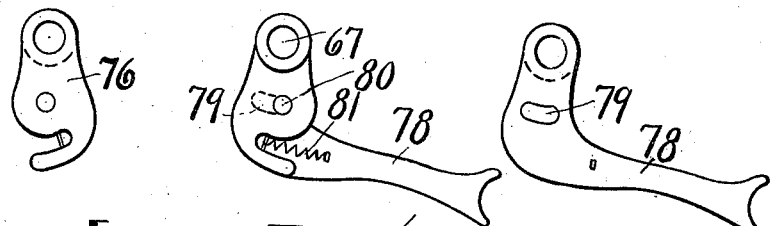
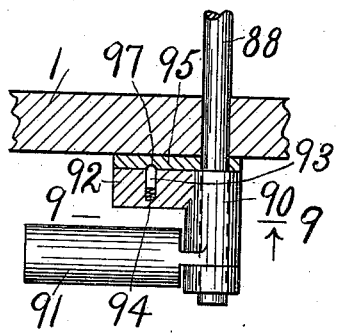
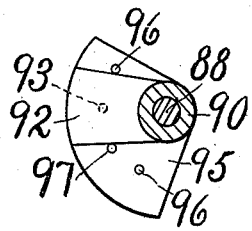
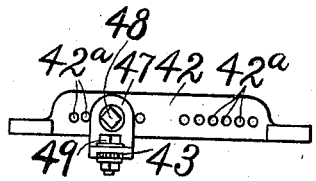

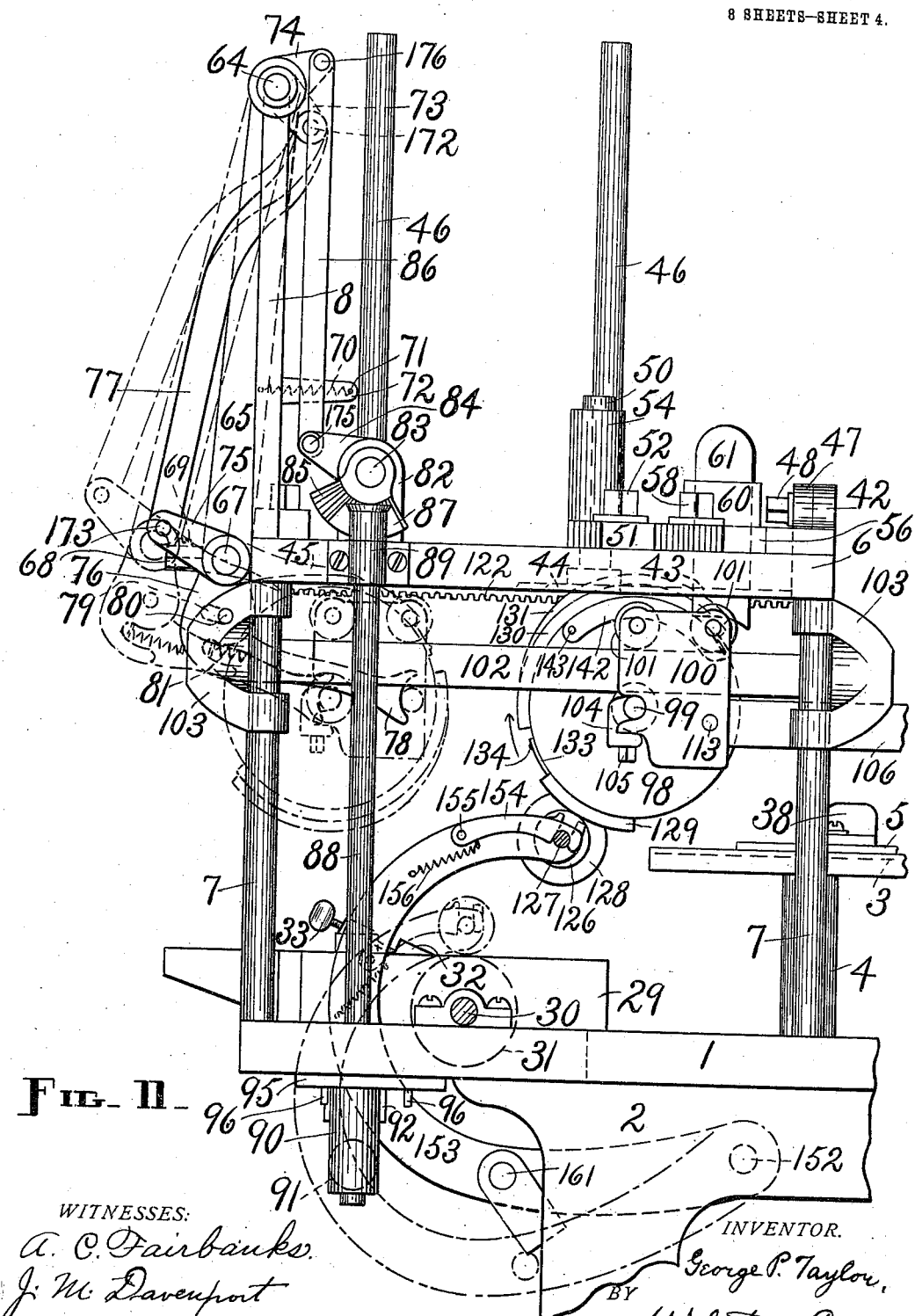

G. P. TAYLOR.
ENVELOP MACHINE.
APPLICATION FILED OCT. 13, 1909.

977,758.

Patented Dec. 6, 1910.
8 SHEETS—SHEET 5.

WITNESSES:
A. C. Fairbanks
J. M. Davenport

INVENTOR.
George P. Taylor,
BY
Webster & Co.,
ATTORNEYS.

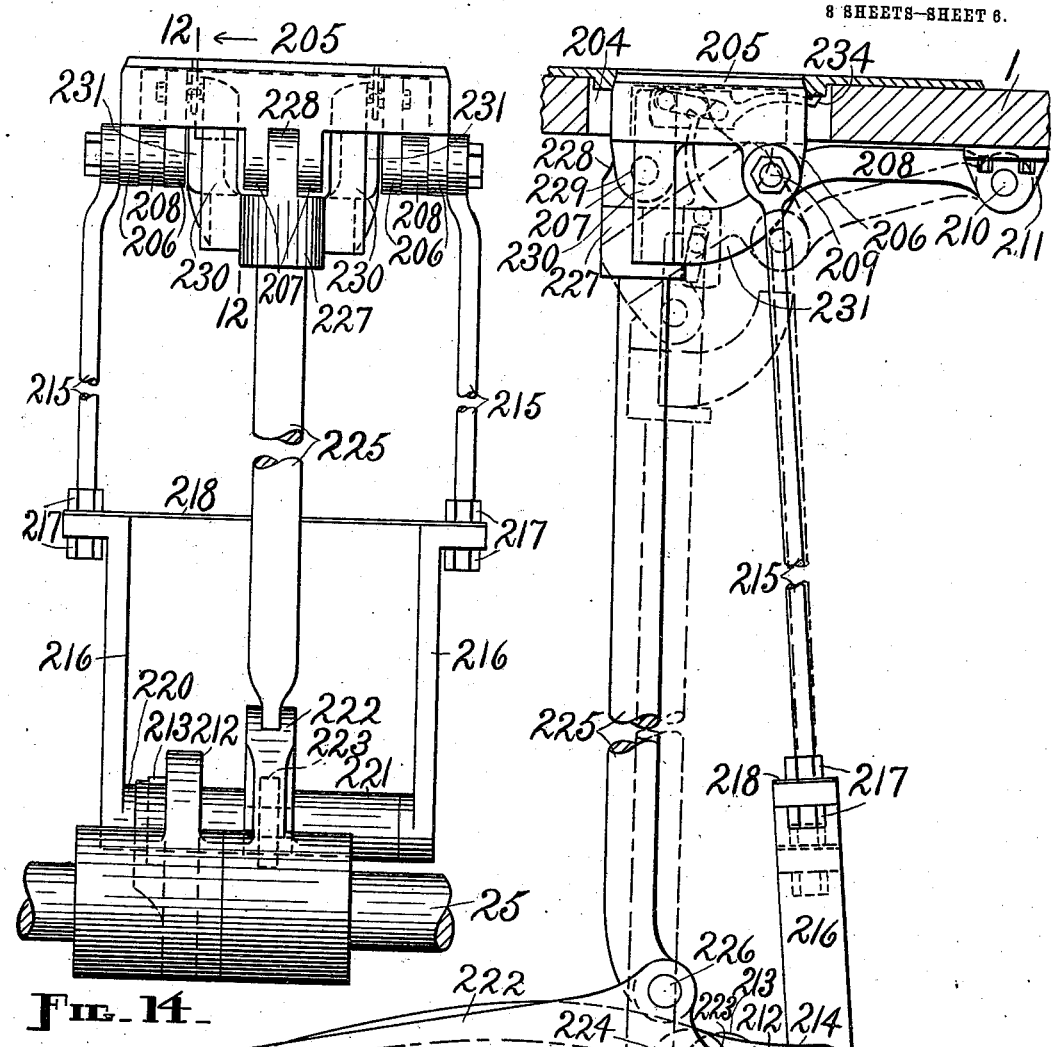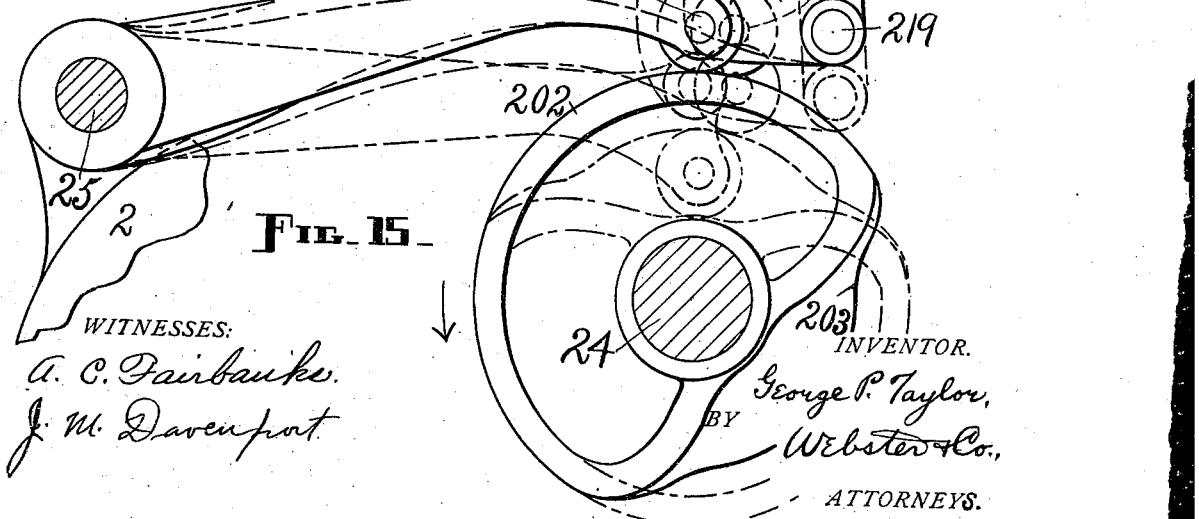

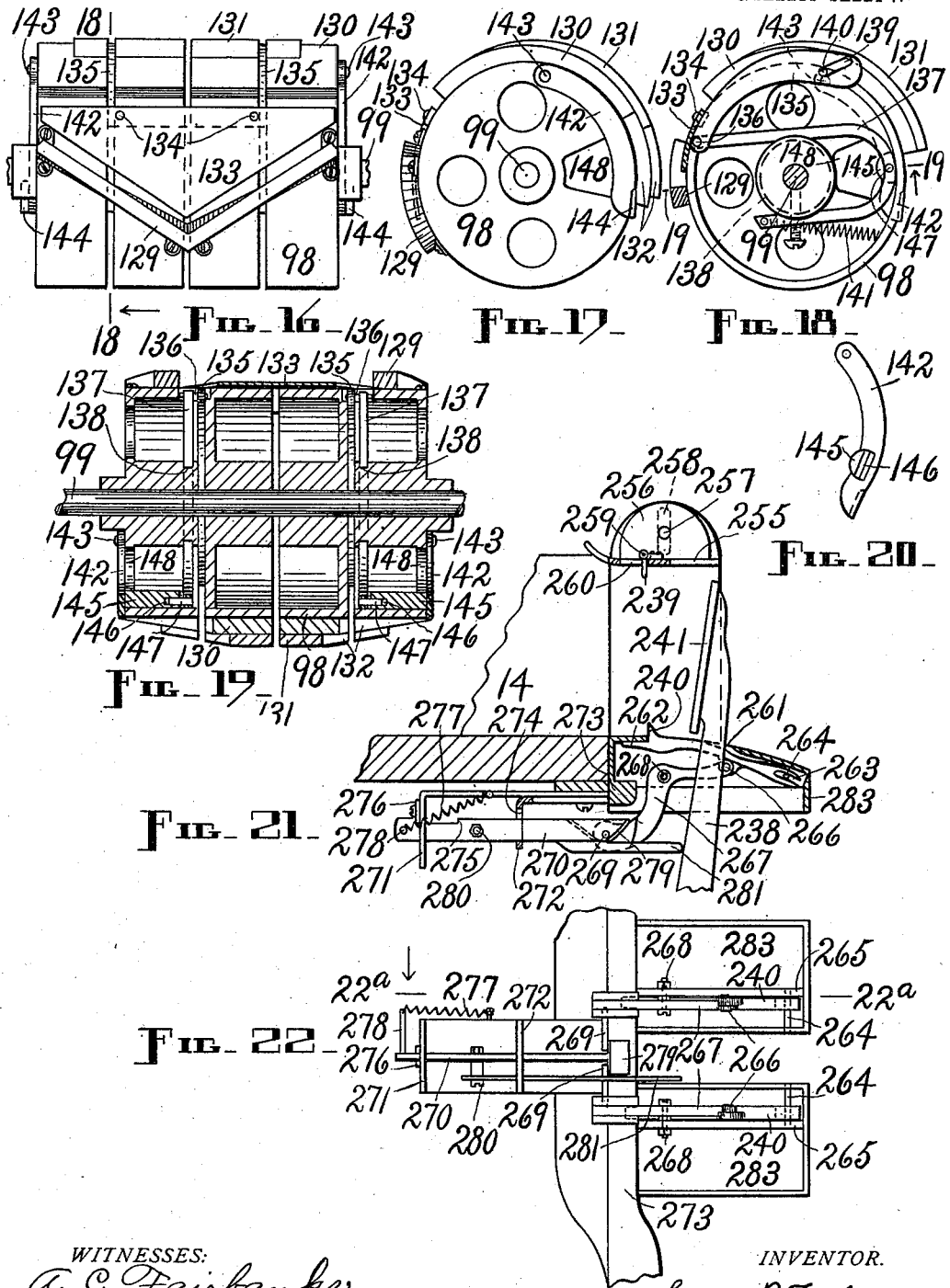

G. P. TAYLOR.
ENVELOP MACHINE.
APPLICATION FILED OCT. 13, 1909.

977,758.

Patented Dec. 6, 1910.

8 SHEETS—SHEET 8.

WITNESSES:
A. C. Fairbanks.
J. M. Davenport

INVENTOR.
George P. Taylor,
BY Webster & Co.,
ATTORNEYS.

UNITED STATES PATENT OFFICE.

GEORGE P. TAYLOR, OF HOLYOKE, MASSACHUSETTS.

ENVELOP-MACHINE.

977,758.　　　　　Specification of Letters Patent.　　　Patented Dec. 6, 1910.

Application filed October 13, 1909. Serial No. 522,402.

*To all whom it may concern:*

Be it known that I, GEORGE P. TAYLOR, a citizen of the United States of America, residing at Holyoke, in the county of Hampden and State of Massachusetts, have invented a new and useful Envelop-Machine, of which the following is a specification.

My invention relates to improvements in machines for making envelops, and more particularly to the gumming and feeding mechanism for the envelop blanks, the pressure-applying mechanism for the folded blanks or envelops, the discharging mechanism for the envelops by means of which they are transferred from the folding-box to the chute, and the delivery mechanism for the envelops by means of which they are moved forward from the chute into the receiving trough.

Briefly my invention resides in a new combination gummer and feed which operates from below instead of from above a stack or pile of envelop blanks, through the direct medium of a gummed surface which contacts with and engages the bottom sheet or blank in the pile, gumming and removing such bottom blank or sheet at one and the same time; in certain peculiar operating mechanism for a vertically-reciprocating plunger which presses the folded blanks or envelops to insure the sticking of the gummed flap to the end flaps and which is the folding-plunger, such mechanism including means for balancing said plunger to a considerable degree, or for providing a balanced motion therefor; a reciprocating and tilting folding-bed or trap, provided with knock-off fingers, for discharging the envelops into the chute; and improved mechanism for delivering the envelops to the receiving trough, such mechanism consisting in part of top and bottom disappearing back-stops which permit the envelops to be pushed into such trough by the presser-arm, all as hereinafter set forth.

There are included in the combination gummer and feed mechanism mentioned above, among other features, means of control for the feed, means for retaining the pile of blanks in position so that it is supported at all times, means to release from the picker roller the blank taken thereby from the pile, and means for applying gum to the gumming plate carried by said roller or picker.

The objects of my invention are, first, to produce an envelop machine which is capable of handling at an increased speed and turning out a better grade or quality of envelops, in the manufacture thereof, than has been done heretofore, an advantage which is to some extent due to the fact that in this machine the gummed blanks are delivered very close to the folding-box; second, to produce an envelop machine which handles the blanks from which the envelops are made with a more positive and unfailing action, and also handles said blanks in a way which avoids soiling them; third, to produce a machine that can be run continuously without having to be stopped for the purpose of replenishing the blanks, since the same can be supplied while said machine is in full operation; fourth, to regulate to better advantage in the machine the amount of pressure on the folded blanks or envelops; fifth, to protect the folding-plunger mechanism from injury; sixth, to increase the certainty, safety, and facility with which the folded envelops are removed from the folding-box, this result being attained through the medium of mechanism which drops the trap some distance vertically while in a level position and before tilting it, so that said trap can carry each envelop clear of the walls of the folding-box, and consequently enables the folding-plunger to assist in the envelop-discharging operation by forcing from said box said envelop carried away and discharged by said trap, since a portion of the downward movement of said plunger is thus permitted to be utilized for this purpose—it may be noted, too, in passing, that the tilting action of said trap or its mechanism operates the knock-off fingers without any outside contact being required; seventh, to provide comparatively simple but entirely effectual means for taking care of the folded envelops at the delivery point of the machine, and, eighth, to produce an envelop machine which not only possesses all of the advantages herein pointed out, but is simple in its operation, makes less noise than other machines, and is strong, durable, easy to keep in repair and running order and condition, and withal practicable and efficient.

Other objects and advantages will appear in the course of the following description.

I attain the objects and secure the advantages herein pointed out by the mechanism illustrated in the accompanying drawings, in which—

Figure 2:
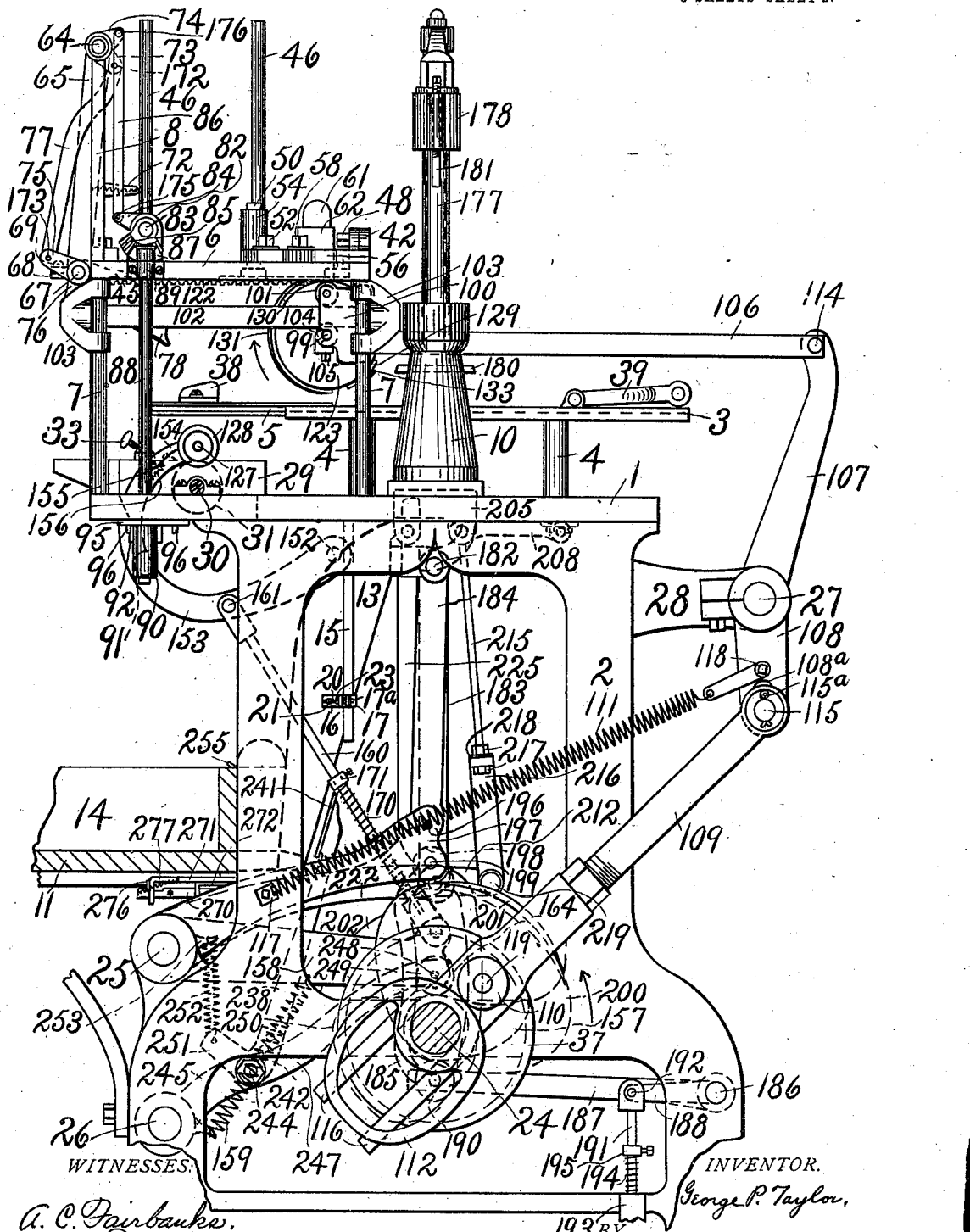
Figure 12:
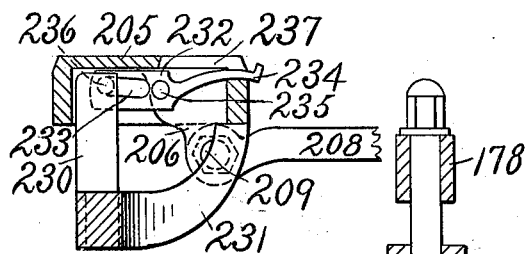
Figure 13:
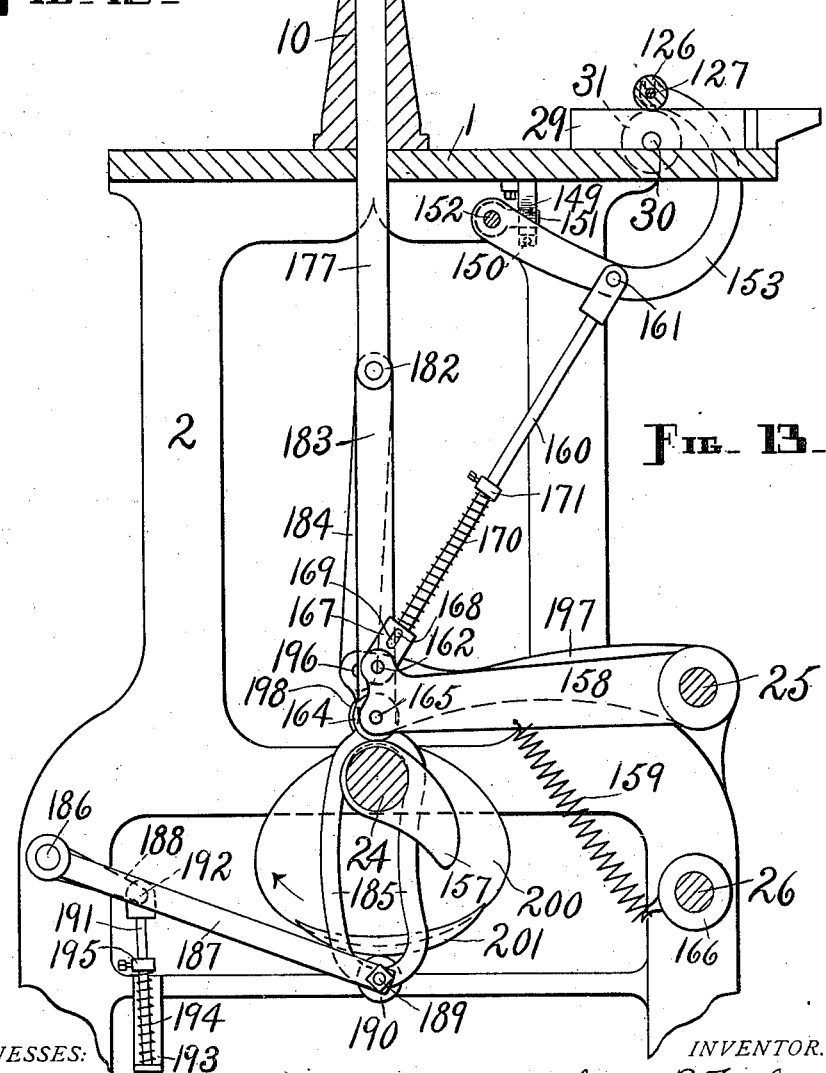
Figure 23:
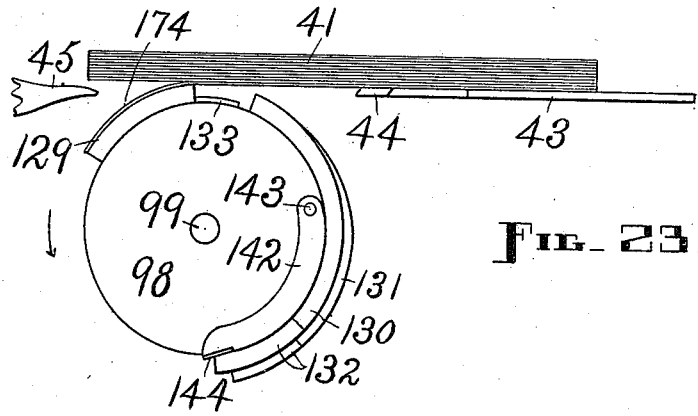
Figure 24:
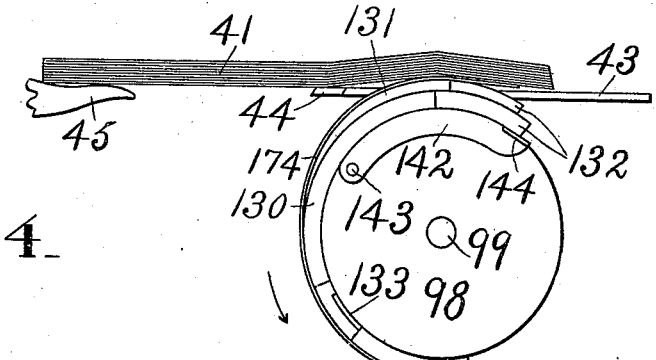

Figure 1 is a front elevation of the major portion of an envelop machine that embodies a practical form of my invention; Fig. 2, a side elevation of such machine; Fig. 3, a top plan of the uppermost table of said machine, or the table for the envelop blanks, with the parts carried thereby or supported thereon; Fig. 4, a side elevation of one of the members, a cam-plate or dog for causing to be actuated one of the operating arms for the picker knock-off plate, carried by said table; Fig. 5, an enlarged detail of the short arm, viewed from the inside, which retains the operating arm of the operating mechanism for the blank-supporting fingers in the path of the picker shaft; Fig. 6, an enlarged outside elevation of said arms assembled on their supporting shaft; Fig. 7, an enlarged detail of said operating arm; Fig. 8, an enlarged front elevation in partial section of the manually-operating means for elevating said blank-supporting fingers to raise the pile of blanks out of the path of the gum-plate; Fig. 9, a plan and section on lines 9—9, looking in the direction of the arrow, in Fig. 8; Fig. 10, a front elevation of the cross-piece and one of the envelop-blank supports on the uppermost table; Fig. 11, an enlarged side elevation of the gummer and feed mechanism, showing the rotary picker, the blank-supporting fingers and operating mechanism therefor, and the gum-transfer roller each in two positions, the inactive positions of said fingers and said roller being represented by dot-and-dash lines, and the gum-receiving position in full lines and the "picking" position by dot-and-dash lines of said picker; Fig. 12, a section on lines 12—12, looking in the direction of the arrow, in Fig. 14; Fig. 13, a detail showing the plunger-operating mechanism and the gum-transfer roller-operating mechanism from the inside of the machine looking toward the right-hand side; Fig. 14, an enlarged front elevation of the discharging mechanism, the middle portions of the connecting members being broken out; Fig. 15, an enlarged side elevation of said discharging mechanism, with portions broken out as in the preceding view, said elevation being taken inside of the machine looking toward the left and showing the two extreme positions of said mechanism in which latter are included the trap and the knock-off fingers; Fig. 16, an enlarged side elevation of the reciprocating and rotary picker; Fig. 17, an end view of said picker; Fig. 18, a cross-section or interior view on lines 18—18, looking in the direction of the arrow, in Fig. 16; Fig. 19, a longitudinal section on lines 19—19, looking in the direction of the arrow, in Fig. 18; Fig. 20, a detail of one of the arms with which the ends of said picker are equipped; Fig. 21, an enlarged detail of the delivery mechanism, taken on lines 22ª—22ª, looking in the direction of the arrow, in Fig. 22; Fig. 22, a bottom view of said delivery mechanism, and Figs. 23, 24, and 25, each an explanatory view disclosing some feature of the gumming and feeding operation.

Similar figures refer to similar parts throughout the several views.

First considering the frame and other supporting parts of the machine, it will be observed that I provide a table 1 resting on two side pieces 2, two slide-ways or tracks 3 mounted on posts 4 which rise from said table, such tracks being for a horizontal envelop-blank carrier 5 which moves forward and backward in the machine, an envelop-blank-supply table 6 mounted at the front of the machine on posts 7 which also rise from said table 1, vertical brackets 8—8 on the table 6 at its front edge, two hollow posts 10 secured to the table 1 over the sides 2, an envelop-receiving table 11 suitably supported from the front of said sides below the table 1, and a chute 13 extending from said table 1 to said table 11, said chute having a forward inclination from top to bottom and being provided or connected at the base with a forwardly projecting horizontal trough 14 which is let into said table 11 and the upper surface of the floor of which is level with the corresponding surface of such table. The sides 2 of the frame may be stiffened by means of cross-pieces to whatever extent is necessary, and provided with whatever supporting parts are required, but some of these parts and members have been omitted from the drawings in order to avoid obstructing essential elements which appertain more directly to the invention, and for this reason as well as for lack of space, too, portions of the frame, the table 11, and other elements have been broken off or broken away.

The chute 13 comprises two side pieces that are adjustably supported from two rods 15, depending from the table 1, by means of slotted angle-irons 16—16 secured to said sides on the outside, and clips 17—17 clamped on to said rods. Slots 20 in the angle-irons 16, through which screws 21 pass to fasten said angle-irons to the side pieces of the chute 13, enable the latter to be adjusted forward or backward, and slots 22 in said angle-irons, through which screws 23 pass to fasten the angle-irons to the clips 17, enable said side pieces to be adjusted laterally. Vertical adjustment can also be effected by loosening the clips 17 and moving them up or down on the rods 15. Screws which clamp the clips 17 to the rods 15 are represented at 17ª. The chute opens at the top into the folding-box as usual, and at the bottom into the trough 14.

Journaled in the sides 2, below the horizontal plane of the table 11 and in the center of the machine, is a main-driving and cam shaft 24. Parallel with each other and with the shaft 24 are two shafts 25 and 26 which are mounted in the sides 2 forward of said shaft 24. The shaft 25 is above the horizontal plane of the shaft 24, and the shaft 26 below such plane. A rock-shaft 27 is journaled in the frame in suitable brackets 28 which project rearwardly from the sides 2. The main-shaft 24, in practice, may be equipped with the usual driving pulley, clutch, and balance or hand-wheel, although the precise manner of and means for actuating said shaft is not material to the present invention.

On the table 1 at the front end is a gum-box 29 through which extends longitudinally a shaft 30 having a gum-supply roller 31 mounted thereon in such box. There are, also, a "doctor," scraper or shoe 32, for the roller 31, and adjusting screws 33 for such shoe. The gum-roller shaft 30 is suitably journaled in the gum-box 29 and on the table 1, and it extends beyond the right-hand edge of said table and has tight on its protruding terminal a pulley 34 and a hand-wheel 35. A cross-belt 36 connects the pulley 34 with a pulley 37 tight on the main shaft, as shown in Fig. 1, and so drives the gum roller 31 while the machine is in operation. The hand-wheel 35 affords means for rotating the roller 31 when the machine is idle, it being frequently necessary to so operate said roller for purposes of adjustment, cleaning, etc.

The carrier 5 is provided adjacent to its front end with two lugs 38, and has pivoted thereto adjacent to its rear end a connecting-rod 39. This carrier is of ordinary construction, and the mechanism for operating the same from the main shaft and which connects with the back end of the rod 39 is also of ordinary construction, both being old and well-known, hence it has not been deemed necessary or advisable to encumber this case with fuller or further illustrations of the same. At this point it is pertinent to state that the folding mechanism for the envelops, or rather for the blanks out of which the envelops are made, with the exception of two members presently to be described, is omitted, since it forms no part of my invention, is old and well-known, and is not needed for a full and clear understanding of said invention. The last-mentioned omitted parts are the folders themselves and the mechanism which operates them, the location of the former being in the center of the table 1 between the posts 10.

The parts of the machine thus far described are generally very similar to corresponding parts in other types or styles of envelop machines, excepting in so far as such parts are more or less directly influenced by the new features or combine more or less intimately with them. Having, now, very fully explained the aforesaid parts, I will next take up in detail the description of the several new features in both their structure and function, commencing with the combination gumming and feeding appliances and mechanisms.

As has been stated, envelop blanks are fed from the bottom of the pile in this machine, instead of from the top of a pile as in many other envelop machines, which fact renders it necessary to cut out the table 6, as shown at 40, in Fig. 3, and to provide supports over or within such opening for the blanks, certain of such supports being adjustable and certain others being automatically movable in and out beneath the front end of the pile of blanks. A blank or a pile of blanks 41 in plan is indicated by dot-and-dash lines in Fig. 3, and in side elevation in full lines in the last three views. As herein represented, the table 6 really consists of two separate pieces or sections united at the back by a cross-piece 42, but this is immaterial so long as the required opening 40 is provided.

Two center back supports 43, two lateral back supports 44, and two movable front fingers 45 support the pile of blanks 41 from below, and uprights or posts 46 support said blanks at the sides, centering them and retaining them in pile formation. The supports 43 and 44 all are horizontal, of course, and the fingers 45 have a generally horizontal direction. The supports 43 are merely plates or slides arranged to uphold the back end of the pile 41. Angular brackets 47—47 are provided to carry the supports 43. A series of horizontally-arranged holes 42$^a$, Fig. 10, is tapped into the face of the cross-piece 42 to receive bolts 48 by means of which the vertical parts of the brackets 47 are fastened to said cross-piece, the plurality of such holes permitting the brackets with their supports to be adjusted laterally. The supports 43 are attached in slide-ways under the horizontal parts of the brackets 47 by means of bolts 49 which pass through longitudinal slots 43$^a$ in said supports, the slots permitting the supports to be adjusted forward and back. The supports 43 are thus capable of being adjusted to accommodate themselves to blanks of different shapes and sizes. The supports 44 are provided with vertical posts 50 which are received in split collars 54 at the inner ends of two horizontal plates or slides 51 secured to the table 6 by means of bolts 52 which pass through longitudinal slots 53 in said slides. The split collars 54 and bolts 55 are employed to secure the posts 50 and the supports 44 to the slides 51. The supports 44 uphold the lateral ends of the pile 41 from behind, and can be adjusted to suit blanks of any size and shape by means of the bolts 55 and 52, owing to the presence of the split collars 54 and the slots 53 in the slides 51. The four posts 46 are carried at the inner ends of the same number of horizontal plates or slides 56 longitudinally slotted at 57 to receive bolts 58 which secure said slides to the table 6. The presence of the slots 57 in the slides 56 enables the latter to be shifted so as to locate the posts 46 in the angles in the blanks between the several flap portions of such blanks—see Fig. 3. From the foregoing it is clear that, when the fingers 45 are normally disposed or in active position beneath the front end of the pile 41, not only said pile as a whole but every blank therein is held in place on the supports 43 and 44 and said fingers by the posts 46, and that this condition must obtain as long as the fingers remain undisturbed.

Fastened by bolts 59 in vertical slideways 60, which overhang the opening 40 in the table 6 near the cross-piece 42, are two cam-plates or dogs 61. These dogs are vertically adjustable due to the fact that there is a longitudinal slot 62 in each, as appears in Fig. 4. The office of the dogs 61 will be explained hereinafter.

Journaled in the tops of the brackets 8, in line with each other and parallel with the front edge of the table 6, are two rock-shafts 63 and 64. Depending loosely from the adjacent terminals of the rock-shafts 63 and 64 are two arms or hangers 65 connected by a cross-piece 66. Loosely journaled in the bases of the hangers 65 is a rock-shaft 67 to which the front terminals of the fingers 45 are rigidly secured, although preferably in such a way that said fingers can be adjusted laterally to better accommodate them to the front ends of envelop blanks of different angles. Split terminals 68 and screws 69 are adequate for this purpose. Springs 70, extending between the hangers 65 and pins 71 which project toward each other from the rear ends of extensions 72 on the back sides of the brackets 8, tend to swing said hangers backward at their bases and to retain said bases normally against the front edge of the table 6, thus locating the fingers 45 in supporting position beneath the front of the pile 41. Tight on the rock-shaft 64 are two crank-arms 73 and 74, and tight on the rock-shaft 67 are two crank-arms 75 and 76. When the parts are normally disposed, the crank-arm 73 has a generally backward and downward direction, the crank-arm 74 has a generally backward and upward direction, the crank-arm 75 has a generally forward but slightly upward direction, and the crank-arm 76 has a downward direction. A rod 77 connects the crank-arms 73 and 75. The crank-arm 75 is on the right-hand terminal of the shaft 67, and the crank-arm 76 on the left-hand terminal of said shaft. Loose on the shaft 67, at the left of the crank-arm 76, is an angular arm 78 which extends backward beneath the table 6. The upright part of the arm 78 has a slot 79 therein, the longitudinal center of which is an arc of a circle struck from the center of the rock-shaft 67, and the crank-arm 76 is provided with a pin 80 situated to enter and operate in such slot. A spring 81 is so attached at opposite ends to the crank-arm 76 and the arm 78, respectively, below the aforesaid pin and slot, as to dispose the parts normally with said pin in the back end of said slot, thus keeping the free end of said arm 78 up and providing for forward movement of the parts, swinging as they do from the rock-shafts 63 and 64, without diverting said free end of the arm 78 from a horizontal path of travel. This will be made clear presently, and the reason given why provision of this kind is required.

Journaled in a bearing 82, on the table 6 near the right-hand front corner, is a short horizontal rock-shaft 83, and tight on the left-hand and right-hand ends, respectively, of this shaft are a crank-arm 84 and a segment-gear 85. A rod 86 connects the crank-arm 84 with the crank-arm 74 which is on the right-hand terminal of the rock-shaft 64. Meshing with the segment-gear 85 is a segment-gear 87 tight on the upper end of a vertical rock-shaft 88 journaled in a bearing 89, on the right-hand edge of the table 6, and in the table 1. Tight on the lower terminal of the rock-shaft 88, below the table 1, is a collar 90 which is provided with an inwardly-extending handle 91 below and an inwardly-extending wing 92 above, the latter being provided with a pin 93 which has a spring 94 under it and projects through the top of said wing, as shown in Fig. 8. Secured to the under side of the table 1, above the collar 90 and the wing 92, is a segmental stop plate 95. Arranged in an arc of a circle having the axis of the shaft 88 for a center and a radius equal to the distance from said axis to the axis of the pin 93, are two pins 96 and two holes 97 in the bottom of the plate 95, the pins being at the ends of such arc with the holes between, as best shown in Fig. 9. The distance between the pins 96 is greater than the width of the wing 92, and said pins extend downward both sides of said wing to limit absolutely the movement of the same and consequently the rotary motion of the rock-shaft 88, while the spring-pressed pin 93 is adapted to enter either of the holes 97 for a similar purpose, only in this case the resistance offered thereby can be overcome by applying manual force to the handle 91. In other words, the pins 96 fix outside limits to the movement of the wing 92, while the pin 93 in connection with the holes 97 temporarily locks said wing in either of the positions determined by said pins 96, and prevents it from being moved to the other position without requiring more force to be exerted than can be through the segment-gears 85 and 87 from the parts connected with the crank-arm 84. What has just been described is the throwout portion or mechanism of the combination gumming and feeding mechanism, by means of which it is possible to cause the gumming and feeding operation readily to be discontinued without stopping the machine or the whole of said combination gumming and feeding mechanism, as will appear later.

Coöperating with the mechanism that operates the fingers which assist in supporting and releasing the envelop blanks and which has just been described, is a reciprocating and rotary combination gummer and feed picker-roller 98 mounted on a shaft 99. Said shaft extends crosswise of the machine and has its terminals journaled in trucks 100—100 each of which is provided at the top with two rolls 101 to run on a bar or track 102. The trucks 100, with their rolls 101, and the shaft 99 may be said to constitute a carriage for the roller 98. The tracks 102, one on each side of the machine, have their ends fastened to four brackets 103 supported on the posts 7. The shaft 99 is held in place in each truck 100 by a block 104 and nut 105, wherefore said shaft can be removed from its bearings without difficulty should occasion require. The trucks 100, and with them the shaft 99 and the roller 98, are reciprocated on the tracks 102 through the medium of two connecting-rods 106, two rocker-arms 107, the rock-shaft 27, a rocker-arm 108, a thrust-rod 109 provided with a roll 110, a spring 111, and a cam 112 on the main shaft 24. Each connecting-rod 106 has its front terminal pivoted at 113, Fig. 11, to one of the trucks 100 and its rear terminal pivoted at 114 to the upper end of the associated rocker-arm 107. Both rocker-arms 107 and the rocker-arm 108 are rigidly attached to the rock-shaft 27, the former extending upward and the latter downward. The thrust-rod 109 is pivoted at its upper rear end, at 115, to the rocker-arm 108, and has its lower front terminal bifurcated as shown at 116, in Figs. 1 and 2, to fit over the main shaft 24 and reciprocate and oscillate thereon. The roll 110 bears and rides on the cam 112, being retained in this relation by the spring 111 which is fastened at the front end to the frame of the machine, at 117, and at the back end to the rocker-arm 108 above the pivot 115, at 118, and so causes the motion of said cam to be imparted to the thrust-rod 109 and by the latter in turn to the other operating members for the trucks 100. The shape of the cam 112 is such and it is so timed or so placed on the shaft 24 relative to the other cams thereon and parts driven therefrom or in connection therewith that the shaft 99 and the roller 98 are reciprocated with the proper amount of variation in time and speed. All of the operating members for the rock-shaft 27 are outside of the right-hand side piece 2 and beyond the pulleys 34 and 37 and belt 36. The cam 112 is at the right of the thrust-rod 109, and the roll 110 is mounted on a stud 119 that projects from the same side of the thrust-rod above a horizontal line passing through the axis of said cam and a little behind a vertical line passing through such axis. The pivot 115 is a stud that has a threaded part which extends to the left through a slot 108$^a$ in the rocker-arm 108 and receives a nut 120 to secure said stud to said arm; and the opposite end of said stud is received in the thrust-rod 109, a pin 115$^a$ being used in the stud to hold said thrust-rod in place thereon. By adjusting the pivot 115 up or down in the slot 108$^a$, the travel of the trucks 100 and the members carried thereby is decreased or increased accordingly. Such adjustment is effected by loosening the nut 120, moving the stud and retightening said nut. The arm 78 is in the path of travel of the shaft 99 at the left of the roller 98. The shaft 99, and with it the roller 98 which is tight thereon, is revolved as it is reciprocated, since said shaft has a gear 121 also tight thereon which meshes with a rack 122 fastened to the underside of the table 6. The gear 121 is on the shaft 99 just inside or to the right of the left-hand truck 100. In addition to the roller 98 and the gear 121, there are two friction disks 123 which are mounted on said shaft to revolve therewith or to be revolved thereby. These friction disks have beveled peripheries, and they are laterally adjustable on the shaft 99, rendered so by their hubs 124 which are split and by bolts 125 which are adapted to bind said hubs to said shaft and release them from such binding contact. The office of the friction-disks 123 is both to limit the thrust of and to drive a gum-transfer roller 126 mounted tight on a shaft 127 which also has two friction-disks 128 tight thereon, these latter being so positioned as to be brought intermittently into contact with said friction disks 123 and to be revolved thereby. The friction-disks 128 have their peripheries beveled in the opposite directions to the beveled peripheries of the friction-disks 123, therefore it is plain that, by adjusting the last-mentioned disks, the distance between the shafts 99 and 127 when both pairs of friction-disks are in contact can be varied. By means of these friction-disks three objects are attained: First, the gum-transfer roller is caused to revolve; second, the height to which said roller can rise is fixed, and, third, such height can be changed. The reasons for all this will be stated in due course. In Fig. 11, the friction-disk 123 which would naturally appear on the shaft 99 between the exposed end of the roller 98 and the adjacent truck 100 has been omitted, and so too has the associated friction-disk 128 from the shaft 127, in order not to obscure the working parts behind. The picker-roller 98, although represented in the drawings as being made up of four sections mounted on the shaft 99 and spaced apart thereon, is to be considered as a unit, this method of constructing it being resorted to merely for the sake of convenience in the manufacture of the same.

The construction of the picker in detail will next be considered, the roller 98 being an essential element thereof—the foundation so to speak. This roller is provided on its face or periphery with an angular plate, ridge or rib 129 which extends lengthwise of said roller with its point in the center, which rib constitutes the gummer or picker proper, and conforms generally to the outline of that portion of a blank, as 41, to be gummed, this being the front flap or the edges of the same of the blank as represented in the drawings. The picker roller is further provided on its face with two lags or risers 130 and 131, the latter and higher one falling short of the ends of the former and both having angular edges somewhat similar to the rib 129, as represented at 132. The riser 130 is concentric with the natural periphery of the roller 98, and the riser 131 is eccentric thereto. The rib 129 and the risers 130 and 131 are on the same half of the roller 98, and situated so that the angle of said rib points away from the angles of said risers, and vice versa. These risers come into practical play in the final act of detaching the bottom blank from the pile, by twitching such blank from between the rest of said pile and the supports 43 and 44, a part of the feeding operation not yet explained.

Arranged to operate on the face of the roller 98, between the rib 129 and the riser 130, is a knock-off plate or flap-detacher 133 in the form of a generally triangular plate fastened at 134 to the adjacent ends of two curved links 135 or to such links near such ends. The angular edge of the flap-detacher 133 is adjacent to the rib 129 and points in the same direction. The links 135 are placed between the outside and inside sections of the roller 98, and are pivoted at 136 to contiguous ends of two U-shaped rods 137 arranged in the end sections of said roller to slide in annular grooves 138 in the interior hubs of said sections. The pivotal points 136 are located at the extreme ends of the links 135, which are immediately adjacent to the fastening points 134, and of the long arms of the bent rods 137. Each of the opposite ends of the links 135 has a slot 139 therein to receive a pin 140 that projects into the same from the inner rim of the adjacent end section of the roller 98. (See Fig. 18). A spring 141 is provided for each rod 137 and has one end fastened to the short arm of the rod and the other end to a point on the interior of the roller section in which said spring is located, the arrangement being such as normally to tension the elbows of the two bent rods outward toward the sides of the roller sections which contain them and to maintain the links 135 with the flap-detacher in their inward positions with the latter against the face of the roller. At each end of the roller 98 a curved operating arm 142 is pivoted at 143 to said roller. Each arm 142 has a laterally-extending lip 144 at its free end on the outside, into the path of which as the picker reciprocates and revolves one of the dogs 61 projects, and said arm has a laterally-extending lug 145 on the inside, a short distance from said lip, with a groove 146, Figs. 19 and 20, in the inner end thereof. A pin 147 projects laterally from the elbow of each rod 137 into the groove 146 in the adjacent arm lug 145. Each end of the roller 98 is cut out, as shown at 148, to accommodate the lug 145 on the arm 142 at that end. The lugs 145 and the pins 147 operate in the end roller sections, and said lugs in the openings 148 as well. If, now, the arms 142 be swung inward on their pivots 143, as when their lips 144 contact with the dogs 61, the lugs 145 acting on the pins 147 force the rods 137 in the same direction, against the resiliency of the springs 141; the outer ends of the long arms of said rods are thus carried outward, taking with them the links 135, and the flap-detacher is moved away from the face of the roller 98. The slots 139 in the links 135 permit said links to be moved outward with the flap-detacher, and also to swing to whatever extent may be necessary, the pins 140 being the guiding means and fulcrums. The slots 146, in the lugs 145 for the pins 147, enable the rods 137 to be actuated against the resiliency of their springs without being cramped, and the directions of the slots 139 in the links 135 are such as to cause the slotted terminals of said links to drop during the outward movement of the parts, so that the apex of the flap-detacher is moved farther away from the face of the roller 98 than is the base. This provision is desirable because the gummed flap should be detached from the apex of the rib 129 first and from the ends last, so that the blank will not run backward, wrinkle, belly down, or otherwise get out of shape and place during the detaching operation. Upon the release of the arms 142, the springs 141 retract the rods 137 and so restore the connected members to their former inactive or normal positions with the result that the flap-detacher is drawn in against the face of the roller 98 again.

Two split lugs 149 depend from the under side of the table 1, and secured for adjustment in said lugs, by means of bolts 150, are two eye-studs 151 which afford bearings for a transverse rock-shaft 152. The rock-shaft 152 is behind the lugs 149. Fast at their rear ends on the rock-shaft 152 are two curved rocker-arms 153 which extend forward and upward, through suitable openings in the table 1 adjacent to the ends of the gum-box 29, to afford bearings at their free terminals for the shaft 127, to locate the gum-transfer roller 126 above the gum-supply roller 31, and to elevate said roller 126 into the path of the rib 129 on the roller 98 and retract it from such path. The split lugs 149 and the bolts 150 allow the roller 126 to be properly located relative to the roller 31 and the rib 129, by the adjustment thus afforded to the eye-studs 151 and the parts which they carry and support. The free end of each rocker-arm 153 is notched to receive the shaft 127, and said arm is provided on the outside with a latch 154, pivoted thereto at 155, to close down over said shaft and hold it in its bearing, a spring 156 being arranged to retain such latch normally in its locking position. Upon swinging the latches 154 up on their pivots 155 and against the resiliency of the springs 156, the shaft 127 can be removed from its bearings in the rocker-arms 153. A cam 157 fast on the main shaft 24, a cam arm 158 mounted at its front end on the shaft 25, a spring 159, a connecting-rod 160, and a cross rod 161, which extends between the lower portions of the arms 153, constitute the operating or actuating mechanism for said arms. The upper terminal of the connecting rod 160 is pivotally attached to one terminal of the rod 161, and the lower end of said connecting-rod is pivotally attached at 162 to the rear end of the arm 158. Mounted on a stud or pin 165 in the arm 158 below the pivot 162 is a roll 164 which rides on the cam 157. The spring 159 extends between the arm 158 and a collar 166 fast on the shaft 26, which is a fixed shaft, and tensions said arm downward with its roll always on the cam.

In order to provide a little lost motion for the connecting-rod 160, so that it will yield when the friction disks 128 contact with the friction disks 123, if necessary, and so avoid all liability of breakage and lessen the shock of such contact, the part of such rod that is pivoted to the arm 158 is made in the form of a socket 167, separate from the rest of the rod which latter at the base fits into such socket and is provided with a laterally-projecting pin 168 to operate in a slot 169 in each side of the socket, and a spring 170 encircles the rod between the socket and a collar 171 fast on said rod, and disposes the parts so that normally said pin is in the upper ends of the slots. The collar 171 is adjustable so that the tension of the spring 170 can be regulated. From this it is clear that, when the arm 158 is raised by the cam 157, the connecting-rod 160, extended by the spring 170 to its full length, is carried with said arm until some obstruction is offered when, assuming that the maximum displacement of said arm by said cam has not taken place, the major portion of said rod stops but the socket 167 continues upward against the resiliency of said spring, the slotted parts 169 of the socket moving up on the pin 168. As soon as the parts descend again the shortened rod is lengthened once more by the spring 170. Very little lost motion is needed here, and the desired effect is more in the nature of a cushioning effect than anything else.

Starting with the combination gumming and feeding mechanism disposed as in Figs. 1, 2, 3, 8, 9 and 13, and assuming that there is a pile of blanks supported from the table 6 and by the fingers 45, the operation of said mechanism in full is described as follows: The cam 112, on the revolving shaft 24, through the medium of the thrust-rod 109, connecting-rods 106, and intervening mechanism, causes the trucks 100 to reciprocate on the tracks 102. The trucks 100 carry with them forward and backward the shaft 99 and the rotary picker thereon, and said shaft and picker are caused to rotate, through the medium of the rack 122 and the gear 121 on the shaft, first in the direction of the associated arrows in Figs. 2 and 11 as the parts advance, and then in the opposite direction as said parts retreat. Just before the picker arrives at the position shown in full lines in Fig. 11, traveling forward and rotating in the direction of the associated arrow, the cam 157, on the revolving shaft 24, through the medium of the arms 158 and 153 and connecting-rods 160, throws up the gum-transfer roller 126, as far as the friction-disks 128 and 123 will permit. The roller 126, which before was in contact with the revolving gum-supply roller 31 in the gum-box 29, is now revolving in the path of the advancing gummer and picker rib 129, as shown in full lines in Fig. 11, rotary motion being imparted to said roller 126 by the same means that imparts such motion to the picker roller 98 owing to the engagement between the two pairs of friction-disks, but the two rollers revolve in opposite directions. The gum-supply roller 31 is revolved constantly from the main shaft, by means of the pulleys 37 and 34, the cross-belt 36 and the shaft 30, consequently the gum-transfer roller 126 when in contact with said roller 31 is revolved therewith and receives a supply of gum therefrom. The rib 129 next contacts throughout its entire face with the roller 126, when said roller is lowered again by its operating mechanism onto the roller 31, there to remain until said rib is again about to arrive at the field of action of the roller, the relative timing of the cams 112 and 157 being responsible for this. Were it not for the friction-disks, the roller 126 might be moved up too far and so gum other parts of the picker besides the rib 129, which would lead to serious consequences as will be readily seen. A further advantage of the friction-disks resides in the fact that, since two of them are adjustable, the amount of pressure between the roller 126 and the rib 129 can be regulated with great nicety, whereby the exact amount of gum required can be applied to said rib. During the further advance of the roller 98 and before it reaches the forward end of its travel, the shaft 99 encounters the back end of the arm 78 and carries said arm bodily forward. The forwardly-moving arm 78 swings forward the hangers 65, against the resiliency of the springs 70, and so takes the fingers 45 from beneath those portions of the blanks 41 which are supported by said fingers, but the picker has traveled forward into a position to serve as a substitute support for said blanks in place of said fingers. As the hangers 65 swing outward at the bottom, on the rock-shafts 63 and 64, the connecting-rod 77 also swings outward at the bottom, on a pivot 172 which connects it with the crank-arm 73, raising the crank-arm 75, to which it is pivoted at 173, and so rocks the shaft 67 and turns down or dips the fingers 45; and the pin 80 moves forward in the slot 79, as said pin is carried with the crank-arm 76 forward and out of the perpendicular, so that the free or back end of the arm 78 is thereby permitted to remain in contact or engagement with the shaft 99 from the time the encounter takes place until the front end of the travel of said shaft is reached, and during the backward travel as well until the shaft leaves said arm. When the picker arrives at the end of its forward travel, it and the finger-operating mechanism including the fingers 45 themselves are disposed as represented by dot-and-dash lines in Fig. 11. At this time the rib 129 is in contact with the underside of the front flap of the bottom blank in the pile, and said flap is adhering to said rib. It may be noted here that the movable parts of the picker are now disposed as shown in Figs. 16, 17 and 18, and that they have been so disposed since said picker left the rear end of its travel and will so remain until the picker again approaches such end of travel.

Figure 25:
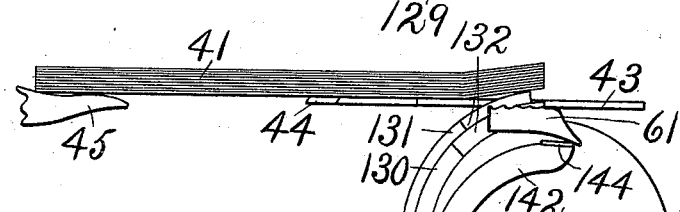

The picker, with the front flap of the bottom envelop blank sticking to the rib 129, next starts back with the direction of rotation reversed, and commences to detach said blank from the rest of the pile. As the picker in advancing pushes as it were the fingers 45 before it and from under the pile 41, so now as said picker travels back said fingers appear to follow and in fact do follow to the extent necessary to resume their supporting position beneath said pile by the time the picker has retreated too far to uphold longer the pile or rather to assist in that function. The fingers 45 are returned beneath the pile 41 through the same agency that moved them forward, that is, the hangers 65, acted on by the springs 70 and the connected and connecting members, the arm 78 following the shaft 99 until said hangers strike the table 6 when said shaft parts company with said arm. The aforesaid bottom blank is now rolled on to the backwardly-traveling and reversely-rotating picker as the latter pulls it from the pile 41, in the manner plainly shown in Figs. 23 and 24. The blank being thus fed is drawn on to the risers 130 and 131, and just before the picker arrives at the position shown in Fig. 25, with the angular parts 132 of said risers directly beneath and bearing up on the pile 41, the picker is ready to drag said blank free from all confining means at the rear, that is to say, from between the rest of the pile and the supports 43 and 44, and does so while the picker is moving from the position shown in Fig. 24 to that shown in Fig. 25, said risers jerking said blank free between these two points or positions. While the picker is passing from the position in Fig. 24 to that in Fig. 25 where it has arrived at the back end of its travel, it also carries the blank over in front and deposits said blank on the carrier 5 behind the lugs 38, sweeping or wiping the blank on to said carrier so to speak, first the ungummed part and then the gummed part. The gum-transfer roller 126 is down on the gum-supply roller 31 at the time the rib 129 with the attached blank passes the gumming point or station, the timing of parts being such that said gum-transfer roller is at such station only during the advance of said rib. The detachment of the former front, now the rear, flap of the blank from the rib 129 is effected through the direct medium of the flap-detacher 133 and the indirect medium of the actuating mechanism therefor and the dogs 61. As the roller 98 reaches the back end of its travel, the arrangement and timing of parts are such that the lips 144 on the arms 142 are carried under the dogs 61 and said arms are depressed or rocked inward on their pivots 143 thereby, the arms in turn actuate the links 135 outward, through the medium of the interposed and connected U-shaped rods and against the force of the springs 141, and said links thrust out the flap-detacher 133 behind or now really above the gummed flap and force said flap off of the rib 129. The detacher does not come into contact with the gummed portions of the flap upon which it acts, but operates between or inside of them. A sufficient amount of gum from the rib 129 is deposited on the flap to insure its adhering to the end flaps during the folding operation. In Fig. 25, the gummed flap has been nearly disengaged from the picker and is just ready to drop and in the very act of dropping onto the carrier with the rest of the blank, with the gummed surface uppermost. Immediately the picker starts forward again and the lips 144 clear the dogs 61, the springs 141 contract to restore the detacher mechanism and the detacher itself to former and normal positions. The blank being gummed and detached in the last two views is indicated by the reference numeral 174, and in these views and Fig. 23 only the further supports 43 and 44 are represented, without the means whereby said supports are themselves sustained.

In the event that it be desired to operate the picker for some reason without feeding the blanks, this can be done readily by grasping the handle 91 and forcing it backward to actuate the wing 92 from the front pin 96 to the rear pin 96, the pin 93 clicking from the front hole 97 to the back hole 97 to assist said rear pin in holding said wing in its new position. The effect of this action is that the collar 90 and the shaft 88 are partially rotated, the connecting-rod 86, which is pivoted at 175 to the crank-arm 84 and at 176 to the crank-arm 74, is actuated to draw down said crank-arm 74, through the medium of the segment-gears 87 and 85 and intervening parts, the shaft 64 is rocked to depress the crank-arm 73, the connecting-rod 77 and the crank-arm 75, and the shaft 67 is rocked to elevate the fingers 45 or swing their free terminals upward and so raise the pile of blanks 41 at its front end high enough to clear the rib 129 whenever the picker is at the forward end of its travel, that being the only place where said rib is presented to said pile, and to elevate the arm 78 or swing its free end upward out of the path of travel of the shaft 99, through the medium of the crank-arm 76 which is tight on said shaft 67 and has its pin 80 in engagement with the front end of the slot 79 in said arm 78. The picker can now be operated freely without affecting the blanks above or disturbing the mechanism that operates the fingers 45. When the handle 91 is moved forward into its former position, the fingers 45 and the arm 78 are lowered by a reverse movement on the part of the intervening mechanism, the pile of blanks then being in readiness for a continuance of the feeding operation and said arm being in the path of the shaft 99.

In passing from either end of its travel to the other the picker does not need to make a complete revolution and, as a matter of fact, does not, only so much of a revolution being called for as will enable the picker rib after rolling up under the front end of the pile of blanks to turn back far enough to properly deposit a blank on the carrier 5. In other words, the amount of such revolution is what is necessary to enable the picker rib to cover the distance between the picking point and the depositing point, and contrariwise.
It will be understood that, while the supports or posts 46 prevent the blanks from being shifted forward and backward by the picker, they do not interfere with the carrying away of the bottom blank by said picker, since said blank passes from between said posts downward through the opening 40 in the table 6.

Passing now to a consideration of the folding-plunger-operating mechanism, and having special reference to Figs. 1, 2 and 13, it will be observed that two vertically-reciprocating rods 177 are arranged in the hollow posts 10, and that a cross-head 178 for a folding-plunger 179 connects said rods at the top. The folding-plunger 179 is a vertical member supported in the center of the cross-head 178, depending some distance below the same, and having a folding-plate 180 at the base. This plunger is also for compression purposes, and it is its use in this capacity with which I have to do more particularly in the present invention. Vertical bolts forming stop pins 181—181 are tapped into the ends of the cross-head 178, over the tops of the posts 10, to limit the downward movement of said cross-head when they encounter said posts, the amount of such movement being changed by adjusting said pins in said cross-head.
The rods 177 are reciprocated by the following means and in the following manner: Connected at their upper ends by a pin 182 to the base of each of the rods 177 are two rods 183 and 184, the rod 183 being the inner one. Each rod 183 has a link 185 at the bottom, which link is merely for the purpose of providing means for said rod to clear the shaft 24 without weakening the rod. A stud 186 projects inward from each side piece 2, and loose on such stud is a double rocker-arm member comprising a long arm 187 and a short arm 188. The arms 187 and 188 extend forward, and each of the former is pivotally connected at 189 with the base of the adjacent link 185, a roll 190 being interposed on the pivot immediately contiguous to the outside face of said link. The rocker-arms 187 and 188 are tensioned upwardly by means of two rods 191 having their upper ends pivoted at 192 to the front ends of the short arms 188 and their lower terminals loose in the inwardly-turned portions of two brackets 193 on the inside of the side-pieces 2, through which inturned portions said rods are adapted to reciprocate freely, and springs 194 encircling said rods between said inturned portions of the brackets and collars 195 on the rods, such collars being adjustable and so providing for changing the tension of said springs. The eyes in the links 185, through which the shaft 24 extends, are curved so as to enable the rods 183 to be swung on the pivots 182 by the action of the rocker-arms 187 as they oscillate on the studs 186. The base of each rod 184 is pivoted at 196 to the rear end of a cam arm 197 loose on the shaft 25. A roller 198 is mounted on a stud or pin 199 carried by each arm 197 below the pivot 196.

A cam 200 is fast on the main-shaft 24 under the roll 198. The "high" part of each cam 200 is widened by a shoe 201 securely attached to said cam on the inside, such shoe normally being over the link roll 190. The cams 200 when in motion, assisted by gravity, cause the folding-plunger 179 to be reciprocated through the medium of the arms 197, rods 184 and 177, and the crosshead 178, and to be brought down positively at the end of its downward travel each time through the medium of the shoes 201, the rolls 190 and the rods 183. That this last may be fully comprehended, it should be observed that the weight of the folding-plunger members is supported by the rolls 198 on the cams 200 excepting just before said plunger reaches the end of its downward stroke when there is or may be, assuming the machine to be engaged in the work of folding envelops, a tendency to stop short of such end of the stroke, and it is at this time that the shoes 201 act to finish positively said stroke and insure the sticking of the flaps of the folded envelop beneath the folding-plate 180. The shoes 201 operate while the rolls 198 are on or above the "low" parts of the cams 200. The rocker-arms 187, upwardly spring-pressed as they are, serve to steady the movement of the cam-operated and more especially the shoe-operated parts, and as balancing mediums for the reciprocating members. In the event that some obstacle gets into the folding-box or some obstruction otherwise interferes with the downward movement of the plunger 179, the rolls 190 are not carried low enough to be ridden down by the shoes 201, but the latter pass under said rolls, instead of over them, either in or out of contact therewith according to their location, wherefore said plunger is not forced to complete its down stroke or further depressed and all liability is obviated of breakage or other injury to the machine from such obstacle or obstruction. After getting rid of the interfering medium the folding-plunger-operating mechanism resumes its former action.

Taking up next the discharging mechanism, which depends for its operation on two cams 202 and 203 fast to the main shaft 24 in the center, as illustrated to the best advantage in Figs. 12, 14 and 15, attention is again called to the fact that this mechanism has to do with the bottom of the folding-box which coöperates in a way with the folding-plate 180. In the table 1 below the folding-plate 180 is an opening 204, and arranged to operate in this opening is a folding-bed or trap 205 which is the aforesaid folding-box bottom. The trap 205 is provided at the rear with two pairs of depending lugs 206 and at the front with a pair of depending lugs 207. Two links 208 connect the trap 205 with the table 1, the front end of each of said links being pivoted at 209 between the lugs 206 in each pair, and the rear end of such link being pivoted at 210 to a bracket 211 on the underside of the table. A cam arm 212 is mounted loose at its front end on the shaft 25, and is provided with a roll 213 which rides on the cam 203, such roll being mounted on a stud or pin 214 set in said arm a short distance from the rear end thereof. As a means for connecting the rear end of the arm 212 with the trap 205, I employ in this case two side rods 215 which depend from the pivots 209, two side bars 216 to the outturned tops of which the lower terminals of said rods are fastened by nuts 217 threaded to said lower terminals one above and one below each of such outturned tops or ears, a stiffening plate or cross-piece 218 connecting said rods between said ears and the upper nuts, and a pivot pin 219 which connects the lower ends of said bars with each other and with said rear end of said arm, sleeves 220 and 221 being used on said pin between said bars and said arm to separate them and add rigidity to the structure.

Loosely mounted at its front end on the shaft 25, at the right of the cam arm 212, is a cam arm 222 which has a roll 223 mounted on a stud or pin 224 at the rear end to ride on the cam 202. A connecting-rod 225 has its base pivoted at 226 to the rear end of the arm 222 above the stud 224, and is provided at its upper end with a head 227. A lug 228 rises from the center of the head 227 between the lugs 207 to be pivoted thereto at 229, two uprights 230 rise straight up from the sides of said head into the interior of the trap 205, and a corresponding number of curved rests 231 extend rearwardly and upwardly from the head to support the back part of said trap when and while the trap is in its horizontal position, the trap then receiving and bearing on said rests at points just inside of the inner lugs 206.

The trap 205 is provided with two knock-off fingers 232, each having a slot 233 in its body portion and a hook 234 at its rear end to engage the back edge of an envelop on said trap, and being pivoted intermediate of its ends at 235 against the inside face of one of the inner lugs 206 a little below the top of said trap. A pin 236 extends outward from each upright 230 near the top into the slot 233 in the adjacent finger 232. A slot 237 is cut in the top of the trap 205 for each finger 232, such slot being so positioned as to enable the hooked portion of said finger to operate in and out of the same from below or to strike upward and forward through said slot and then recede below said trap top.

Owing to the construction and weight of the parts which bear on the cams 202 and 203, gravity alone may be depended on to keep the rolls 223 and 213, respectively, on said cams at all times. The shape of the cams 202 and 203 is such that during more than half of each revolution they maintain the trap mechanism in the positions shown in full and dotted lines in Figs. 12, 14 and 15, with the trap 205 at its highest point approximately on a level with the top of the table 1, then as said cams continue their rotation and lower portions of their peripheries pass beneath the rolls 223 and 213 the arms 222 and 212 and the connecting-rods 225 and connection between said arm 212 and the lugs 206 drop together an equal distance and depress said trap without tilting it, the trap being drawn toward the rear a little way, however, by the links 208 which swing down, and finally upon further rotation of the cams and as the low part of the cam 202 passes beneath the roll 223 and the adjacent higher part of the cam 203 passes beneath the roll 213 the front of the trap is depressed sharply and the knock-off fingers 232 are suddenly thrown up through the slots 237 into an approximately vertical position, all as indicated by dot-and-dash lines in Fig. 15. These operations first take an envelop on the trap entirely out of the way of the folding mechanism and everything above said trap, and then unfailingly discharge said envelop into the chute 13. In tilting, the trap fulcrums on the links 208, also on the connection between the trap and the arm 212, and the relative positions of the pins 236 and pivots 235 change so that the former occupy positions in what were formerly the back ends instead of the front ends of the slots 233 and are under said pivots, resulting in the throwing up of the fingers 232. The rests 231 also pass away from the trap at this time, it not now being necessary that their function be exercised. Upon completing the revolution of the cams the movements just described are reversed and the trap and fingers restored to initial or normal positions, the cam 202 operating first to elevate the trap and withdraw the fingers into said trap, and both cams operating then to elevate the trap to the receiving plate in the table 1.

The relation of the trap-operating mechanism to the folding-plunger-operating mechanism is such, that is, the parts are so timed, that the trap does not begin to descend until after the folding-plunger, under the impulse imparted to it by the shoes 201, has compressed and thoroughly sealed the envelop, and then said trap does not act to discharge the envelop into the chute until said folding-plunger has acted to force the envelop down out of the folding-box. This last result is made possible by the permitted gravity action of the folding-plunger and its carrying parts, limited by the stop pins 181. The shoes 201 maintain their influence over the folding-plunger long enough for the trap to begin its descent while under pressure from said plunger.

The last mechanism to be described is that which delivers the envelops, one at a time, from the chute 13 to the receiving trough 14. This mechanism comprises a sweep or presser-arm 238 which moves the envelop forward, and top and bottom back-stops 239 and 240, respectively, arranged in pairs. In this connection see Figs. 1, 2, 21 and 22. The presser-arm 238 has a plate 241 at the upper end which is designed to sweep an envelop forward into the trough 14 from the chute 13. The base of the presser-arm 238 is rigidly attached to a projection 242 at the right-hand end of a sleeve 243 loose on a horizontal stud 244. Said sleeve is secured at its right-hand end to a bracket 245 which is fastened firmly to the fixed shaft 26. Mounted on the stud 244 and rigidly attached to a projection 246 at the opposite end of the sleeve 243 is an upwardly-extending cam arm 247 provided at its free terminal with a stud or pin 248 upon which is mounted a roll 249. The roll 249 bears on a cam 250 tight on the main shaft 24. The arm 247 has a forward extension 251 and is tensioned toward the cam 250 by means of a spring 252 which connects said extension with a collar 253 fast on the fixed shaft 25 above. From this it is seen that as the cam 250 revolves the arm 247 is caused to oscillate and to rock the presser-arm 238 back and forth on the stud 244, through the medium of the sleeve 243.

The floor of the trough 14 is provided at the rear with two hollow extensions 283 spaced apart and having their upper surfaces curved downward slightly from front to back, as seen to best advantage in Fig. 21, and it is these curved surfaces that extend under the chute 13 to receive the envelops as they slide down said chute in front of the position which the plate 241 occupies when the presser-arm 238 is thrown way back. Two inner flanges 254 on the side pieces which comprise the chute 13, adjacent to the back edges of such side pieces, constitute the runway for the envelops, and the sides of the trough 14 at the back end are provided with inner flanges 255 which are generally horizontal, and the plate 241 oscillates between a position behind the front faces of said flanges 254, passing under them, and a position in advance of the back-stops 239 and 240, and between the extensions 283 and said flanges 255, inwardly to carry an envelop in front of said plate from the chute into said trough, and rearwardly to take position for another envelop. The usual weighted block (not shown) is employed in the trough 14 against which the envelops are pressed as they are fed forward into said trough, and it is for the purpose of supporting the envelops behind, when the plate 241 moves rearwardly, that the back stops 239 and 240 are provided. The presser-arm 238 plays back and forth in the space between the extensions 283.

The flanges 255 overcome any tendency which an envelop might have to "ride up" while being deposited in the trough 14 by the presser-arm plate 241, and each has an ear 256 which is fastened against the inside face of one of the walls of said trough by a screw 257 that passes through a slot 258 in such wall into threaded engagement with said ear, the usual washer being interposed between the wall and the head of said screw. By this means the flanges 255 can be adjusted to give the proper amount of clearance between them and the extensions 283 for the envelops. Each stop 239 is pivoted at 259 to one of the flanges 255 at the back end of a slot 260 therein, and is so arranged that it normally hangs down through such slot and bears against said back edge to support from behind and at the top envelops in the trough, but swings up into said slot when pressure is applied from the rear by plate 241 to admit an envelop being swept forward thereby into said trough. The operation of these gravity stops will be clearly apprehended from an inspection of Fig. 21. More substantial back-stops, automatically operated otherwise than by the direct contact therewith of an envelop borne forward by the plate 241 and gravity, are required to hold in place at the bottom the envelops in the trough 14, and such are found in the members 240 including the operating mechanism therefor.

Referring more particularly to Figs. 21 and 22, it will be seen that each stop 240 is so arranged in one of the extensions 283 as to project normally through a slot 261 in such extension above the floor thereof; that such stop has a lip 262 at the front end to prevent it from rising too far out of said slot, and has a slot 263 in its rear end to receive a horizontal pin 264 fixed in the inner wall of the extension and a bar 265 in said extension parallel with and adjacent to said inner wall; and that said stop is pivoted intermediate of its ends, at 266, to the rear terminal of a bell-crank-lever 267. It will be seen, further, that the bell-crank-levers 267 are pivoted at 268—268 to the bars 265, and have pins 269—269 projecting from their front terminals toward each other, sufficient space being left between adjacent ends of said pins for an operating bar 270. This bar extends longitudinally beneath the trough 14 and is slidingly mounted in the vertical parts of two hangers 271 and 272 which extend forward, the former farther than the latter, and then downward, from a supporting part 273 of the machine frame. The bar 270 passes through a slot 274 in the hanger 272, which slot is long enough to allow said bar to move up and down therein. The upper edge of the bar 270 is cut away at 275, where said bar passes through the hanger 271, to receive a stop 276 fastened against the front end of said hanger. The stop 276 limits the longitudinal movement of the bar 270 and especially its rearward travel, and said bar is held normally with the front end of the cut-away portion 275 against said stop by means of a spring 277 which extends between a pin 278 at the front of the bar and a fixed point on the hanger 271. The back end of the aforesaid bar is in the form of a cam-head 279 which extends on both sides of the bar and inclines upwardly and rearwardly from the lower front edges. The arrangement and construction of these parts are such that the cam-head 279, when in normal position, is directly behind the pins 269 with their juxtaposed terminals immediately adjacent to the bottom edges of said head. Having its front end pivoted at 280 to the bar 270 is an actuating dog or arm 281 for said bar, which arm extends from its pivotal point backward through the hanger 272 into the path of travel of the presser-arm 238.

In practice, when the presser-arm 238 swings forward and before it arrives at the exposed or protruding parts of the back-stops 240 above the extensions 283 said arm encounters the dog or arm 281, and forces it forward with the attached bar 270, against the resiliency of the spring 277. As the bar 270 advances the cam-head 279 passes under the pins 269 and so raises them and rocks the bell-crank-levers 267, with the result that the latter actuate the stops 240 backward and at the same time downward on the pins 264 until they disappear entirely within the slots 261 or below the upper surface of the extensions 283. This disappearance takes place in ample time for the plate 241 to move over the positions which the stops 240 occupy when elevated. Immediately the cam-head 279 passes the pins 269 the front ends of the bell-crank-levers 267 drop, with said pins behind said cam-head, and the stops 240 are moved upward and forward by said bell-crank-levers into active position again, in readiness to support from behind the envelops in the trough 14 as soon as the plate 241 swings back. There are slots in the bottom edge of the plate 241 to accommodate the stops 240 so that said plate can return to initial position while the envelop which it has just advanced in front of said stops cannot return, but is then backed by these stops and the stops 239. The slots in the plate 241 for the stops 240 appear at 282—282, in Fig. 1. Upon the return of the presser-arm and the consequent release of the arm 281 and bar 270 to the spring 277, said arm 281 and bar move back into their former or normal positions, the back side of the cam-head 279 contacting with the pins 269, and said head now riding up over said pins, instead of the latter riding up over the cam-head as was done in the first place, the slot 274 in the hanger 272 permitting the necessary amount of vertical movement or upward inclination on the part of said bar and the connection between the bar and the hanger 271 and stop 276 being sufficiently loose for the purpose. The parts of the bell-crank-levers that carry the pins 269 cannot go any lower, after the lips 262 of the stops 240 strike the extensions 283 adjacent to the slots 261, so necessarily the cam-head rides over said pins, as explained, and takes position behind them in readiness to engage said pins and operate the associated parts when next the presser-arm is actuated forward.

The complete operation of my machine as a whole will be pretty generally understood from the foregoing description of the several members and mechanisms, but following are a recapitulation and brief description of such operation, it being assumed that the parts have first been properly adjusted to handle blanks of a selected size and shape and to handle the envelops made from the same, and the machine has been set in motion. The bottom blank from the pile on the table 6 or supported from said table and by the fingers 45 is removed and gummed at the same time by the reciprocating and rotary picker and deposited on the carrier 5. As soon as the gummed blank is thus disposed of the picker starts on its return for another blank. The carrier 5 immediately upon receiving the first blank moves back with it until it is under the folding-plunger 179 and over the folding-box. It will be noted that it is while the carrier 5 is in the present position that the gum-transfer roller 126 is thrown up into the path of the picker, and conversely while said roller is down said carrier assumes its advanced position. The folding-plunger now descends and forces its plate 180 with the blank through the usual opening in the carrier on to the trap 205. Here the now upstanding flaps are turned down or folded in by the folding mechanism hereinbefore alluded to, with the gummed flap over the two end flaps. Meanwhile the folding-plunger rises out of the way of the carrier and said carrier returns for a second blank. At about the same time that the folding-plunger begins to rise, or possibly a little before, the operation of the trap 205 occurs. At the time of such occurrence the first blank is held by its upstanding flaps in the folding-box, and said trap is up in place again to support said blank by the time said plunger is out of the way and the folders commence to operate, the formation and arrangement of the cams 200, 202 and 203 being such as to insure the aforesaid results. Next the picker feeds the second blank to the carrier, the carrier moves it under the plunger, and the plunger forces it down onto the trap on top of the folded envelop already there, the shoes 201 causing said envelop to be compressed between said trap and the plate 180 and the gummed flap to be firmly and thoroughly stuck to the end flaps. Now the trap descends and tilts and the knock-off fingers 232 are thrown up the second time with the result that the envelop is discharged into the chute 13, arriving at the bottom of said chute in front of the presser-arm plate 241.

During the first cycle of the machine the presser-arm 238 had no work to do, but during the second cycle of the machine and every subsequent cycle said arm moves an envelop forward into the trough 14, actuating the back stops 239 and 240 out of the way, and swings back, leaving said stops to support the envelop or envelops in said trough from behind. The delivery of the first envelop to the trough is the final act which the machine performs during the making of the first and every subsequent envelop. The cam 250 brings about the proper operation of the presser-arm, so also does the cam 112 that of the combination gumming and feeding mechanism, and the cam 157 that of the gum-transfer-roller mechanism, these and the other cams operating in regular and exact sequence or synchronism, relatively, as is required in order to produce the necessary motions and results.

The above-described operations are repeated for each envelop and the feeding, compressing, discharging and delivering continue as long as the machine is in motion and the supply of blanks is maintained, such pile being augmented from time to time as may seem necessary or desirable by simply placing more blanks on top of those being fed from the bottom.

It is pertinent to observe, in connection with the action of the machine, that the envelops are delivered by the machine at every cycle excepting the first and last envelops of the run; for each of these latter the machine must perform two cycles or at least a cycle and a half, because two down strokes of the folding-plunger are required for each envelop, the first to depress the blank ready for folding, and the second to compress the blank after being folded. But inasmuch as said plunger operates on a folded blank and an unfolded blank at once, after the first and until the last, there is an envelop ready to be discharged and delivered at every cycle excepting the first one. At the first cycle of the run the folding-plunger acts on one blank, and at the last cycle of such run the same thing is true, the last blank being a folded blank, however, while the first was in sheet form which had its flaps turned up by said plunger at the initial down stroke of the latter. To state it differently: As soon as the second blank begins to leave the bottom of the pile the machine is constantly engaged in handling two envelop elements until the plunger goes down for the last time, the lower machine elements operating on envelops while the upper machine elements are operating on blanks, and the plunger operating on both at a point which may be said to be that where the two operations of the machine join or overlap. Thus it is that the upper part of the machine is handling a blank simultaneously with the handling of an envelop by the lower part of the machine, and the machine is able to deliver a finished envelop at each cycle, with the above-noted two exceptions.

The action of the machine is very rapid, so that the envelops are turned out speedily and without loss of time consequent upon replenishing the supply of blanks, no stopping of the machine being necessary for this purpose. The table 11 is for the convenience of the operator when the trough 14 becomes full.

The envelops turned out by this machine are complete with the exception of the gumming of their sealing flaps. The general shape of the gummer or rib 129, the lags or risers 130 and 131, and the flap-detacher or plate 133 will vary to correspond to the shape of the flap to be gummed, but this is a matter well understood and easily attended to.

Although the machine herein shown and described is practical and efficient in every particular, it is obvious to one skilled in the art that various changes and modifications may be made therein without departing from the nature of my invention, hence I do not wish or intend to be restricted or confined exactly or too closely to the aforesaid construction. Furthermore, it is conceivable that the feeding mechanism herein disclosed might be applicable for other purposes besides handling envelop blanks.

What I claim as my invention, and desire to secure by Letters Patent, is—

1. Mechanism, for feeding flexible sheets one at a time from the bottom of a pile, comprising a picker-roller having a gum-receiving and -transferring part and provided with a sheet detaching part, means to reciprocate said roller in a right line, and means to rotate said roller during the entire time of its reciprocal movement, the arrangement being such that the direction of rotation of the roller changes with the change in direction incident to the reciprocating motion.

2. Mechanism, for feeding flexible sheets singly from the bottom of a pile, comprising a picker-roller having a gum-receiving and -transferring part and provided with a sheet-detaching part, means to reciprocate said roller in a right line, and means dependent upon such reciprocating means to rotate said roller during the entire time of its reciprocal movement, the arrangement being such that the direction of rotation of the roller changes with the change in direction incident to the reciprocating motion.

3. Mechanism, for feeding flexible sheets singly from a pile, comprising a picker-roller having a sheet-attaching part and provided with a sheet-detaching member adjacent to such part, means to reciprocate said roller, means to rotate said roller during its reciprocal movement, the arrangement being such that the direction of rotation of the roller changes with the change in direction incident to the reciprocating motion, and means to operate said detaching member.

4. The combination, in mechanism for feeding flexible sheets singly from the bottom of a pile, of stationary and movable supporting members for such pile, a reciprocating rotary picker-roller having a sheet-attaching part and adapted when it advances to actuate out of the way and take the place of the removable supporting member beneath said pile and when it retreats to clear the way and permit said member to resume its position beneath said pile, and suitable supports for said movable pile-supporting member and said picker-roller, which supports are separate from and independent of each other.

5. The combination, in mechanism for feeding flexible sheets singly from the bottom of a pile, with stationary and movable supporting members for such pile, and means to withdraw the movable member from supporting relation to said pile and to restore said member to such relation, of a reciprocating rotary picker-roller having a sheet-attaching part and a laterally-projecting member adapted to operate said means to withdraw the movable supporting member and substitute the said picker-roller and to permit of the restoration of the movable supporting member again to active position.

6. Supporting means, for a pile of flexible sheets, comprising a table having an opening therein, laterally-adjustable brackets attached to said table at the back and provided with slidingly-mounted bottom supporting members, slides mounted on said table and provided with additional bottom supporting members, and other slides mounted on said table and provided with side supporting members, all of such supporting members extending inward from the edges of said opening.

7. The combination, in an envelop machine, with supporting means, for a pile of flexible sheets, comprising a table having an opening therein, laterally-adjustable brackets attached to said table at the back and provided with slidingly-mounted bottom supporting members, slides mounted on said table and provided with additional bottom supporting members, and other slides mounted on said table and provided with side supporting members, all of such supporting members extending inward from the edges of said table, of suitable automatically removable and returnable bottom supporting members for the front of such pile.

8. In combination with a table having an opening therein and provided with stationary and movable supporting members, for a pile of flexible sheets, extending inward from the edges of said opening, a reciprocating rotary picker-roller having a laterally-extending member and a sheet-attaching part, and adapted to displace and become a temporary substitute for the movable supporting members beneath said pile, engage and remove the bottom sheet through said opening, and permit of the restoration of said movable supporting members to active position, the movable supporting members being provided with an operating member in the path of said laterally-extending member.

9. The combination, in mechanism for feeding flexible sheets singly from the bottom of a pile, of supporting members for such pile, a reciprocating rotary picker-roller having a gum-receiving and -transferring part and adapted to replace temporarily a certain one or more of said supporting members and to detach the bottom sheet by means of said part, and means to maintain said pile out of range of said part so that said roller can operate without reducing the number of sheets in the pile.

10. The combination, in mechanism for feeding flexible sheets from the bottom of a pile, with stationary supporting members for such pile, of a movable supporting member for such pile, a reciprocating rotary picker-roller having a sheet-attaching part and adapted to replace said movable supporting member beneath said pile and to restore said member to active position, and means to change the position of the movable supporting member to maintain said pile out of range of said sheet-attaching part.

11. The combination, in mechanism for feeding flexible sheets from the bottom of a pile, with stationary supporting members for such pile, of a movable supporting member for such pile, a reciprocating rotary picker having a sheet-attaching part and adapted to replace said movable supporting member beneath said pile and to restore said member to active position, an operating member for the movable supporting member, such operating member being normally controlled by said picker, and means to change the position of the movable supporting member to maintain said pile out of range of said sheet-attaching part and to retain the aforesaid operating member out of operative position relative to said picker.

12. Combination gumming and feeding mechanism, for envelop machines, comprising means to support and render accessible from below a pile of blanks, and a picker-roller mounted to reciprocate and revolve beneath a pile of blanks on such supporting means, and provided with a gum-receiving and -transferring part adapted to engage the bottom blank and coincidently remove it from said pile and gum it, and further provided with means to detach a blank, carried by said roller, from said gum-receiving and -transferring part.

13. Combination gumming and feeding mechanism, for envelop machines, comprising means to support and render accessible from below a pile of blanks, a picker-roller mounted to reciprocate and revolve beneath a pile of blanks on such supporting means, and provided with a gum-receiving and -transferring part adapted to engage the bottom blank and coincidently to gum and remove it from said pile, and further provided with means to detach a blank, carried by said roller, from said gum-receiving and -transferring part, a gum-transfer roller, and means to position said last-mentioned roller temporarily in the path of the aforesaid gum-receiving and -transferring part.

14. Combination gumming and feeding mechanism, for envelop machines, comprising stationary, oscillating, and combined reciprocating and rotary means, including a gum-receiving and -transferring part, for supporting from beneath a pile of blanks and receiving such pile on said part, such oscillating and combined reciprocating and rotary means being arranged and adapted alternately to support such pile in part.

15. Combination gumming and feeding mechanism, for envelop machines, comprising stationary, oscillating, and combined reciprocating and rotary means for supporting from beneath a pile of blanks, such oscillating and combined reciprocating and rotary means being arranged and adapted to alternate in supporting such pile in part, and means to control said oscillating means by said reciprocating and rotary means.

16. Combination gumming and feeding mechanism, for envelop machines, comprising means to support and render accessible from beneath a pile of blanks, such means consisting in part of movable fingers, a picker-roller mounted to reciprocate and revolve beneath a pile of blanks on such supporting means, and provided with a gum-receiving and -transferring part to engage the bottom blank and coincidently to gum and remove it from said pile, and further provided with means to detach a blank, carried by said roller, from said gum-receiving and -transferring part, and operative means for said fingers dependent for action on the position of the picker-roller.

17. Combination gumming and feeding mechanism, for envelop machines, comprising means to support and render accessible from below a pile of blanks, a reciprocating carrier for blanks, and a reciprocating and rotary picker arranged to operate between said supporting means and said carrier and adapted, when at one end of its travel, to afford the sole support for the blanks at that end and, to begin to remove the bottom blank from the first mentioned supporting means, which bottom blank is subsequently deposited on the carrier by the picker.

18. Combination gumming and feeding mechanism, for envelop machines, comprising means to support and render accessible from beneath a pile of blanks, a carrier for blanks, a reciprocating and rotary picker arranged to operate between said supporting means and said carrier and adapted to remove blanks one at a time from the supporting means and deposit them on the carrier, a gum-transfer roller, and means to project said roller temporarily into the path of said picker.

19. Combination gumming and feeding mechanism, for envelop machines, comprising means to support and render accessible from beneath a pile of blanks, a carrier for blanks, a reciprocating and rotary picker arranged to operate between said supporting means and said carrier and adapted to remove blanks one at a time from the supporting means and deposit them on the carrier, a gum-transfer roller, and means to project said roller into the path of said picker, the arrangement being such that said carrier and said roller act sequentially relative to each other.

20. Combination gumming and feeding mechanism, for envelop machines, comprising means to support and render accessible from beneath a pile of blanks, a picker-roller mounted to reciprocate and revolve beneath a pile of blanks on such supporting means, and provided with a gum-receiving and -transferring part to engage the bottom blank and coincidently to gum and remove it from said pile, and further provided with means to detach a blank, carried by said roller, from said gum-receiving and -transferring part, and a reciprocating carrier for a blank so removed from said pile and detached from the gum-receiving and -transferring part.

21. Mechanism, for feeding flexible sheets singly from the bottom of a pile, comprising means to support and render accessible from beneath a pile of such sheets, and a picker-roller mounted to reciprocate and revolve beneath a pile of sheets on such supporting means, and provided with a sheet-attaching part to engage the bottom sheet and remove it from said pile, and further provided with a thickened or raised periphery for a portion of its circumference to assist in such removal.

22. The combination, in an envelop machine, with the frame of the machine, of a reciprocating and rotary picker-roller mounted in such frame and provided with a gum-receiving and -transferring rib and with a flap-detacher adjacent to such rib, mechanism in said roller operatively connected with said flap-detacher, and an operating dog for such mechanism supported by said frame in operative position relative to said mechanism.

23. The combination, in an envelop machine, of stationary means to support and render accessible from beneath a pile of blanks, and a reciprocating and rotary picker adapted to engage, remove, and then release the bottom blank from a pile on such supporting means, such picker being provided with a gum-receiving member to engage such bottom blank when said picker is at one end of its travel, and being further provided with disengaging means for said blank when said picker is at the other end of such travel.

24. The combination, in an envelop machine, of a reciprocating and revoluble picker-roller provided with a gum-receiving and transferring member and with a flap-detacher adjacent to such member, operative mechanism for such flap-detacher carried by said roller, such mechanism consisting in part of an exterior arm, and a stationary actuating dog for such arm in the path thereof.

25. The combination, in an envelop machine, with a reciprocating revoluble picker, of oscillating members, stationary and movable supports for a pile of blanks above such picker, such movable supports being carried by such oscillating members, and actuating means, for said oscillating members, extending into the path of said picker.

26. The combination, in an envelop machine, with a reciprocating revoluble picker, of oscillating members, stationary and removable supports for a pile of blanks above such picker, such movable supports being carried by such oscillating members, an actuating member, for said oscillating members, extending into the path of said picker, and means to maintain the free end of said actuating member in substantially the same horizontal plane regardless of the position of the oscillating members.

27. The combination, in an envelop machine, with a reciprocating revoluble picker, stationary and movable supports for a pile of blanks above such picker, swinging supporting members for such movable supports, an actuating member, for such swinging members, normally extending into the path of such picker, members arranged to rock said movable supports and said actuating member, and means to operate such rocking members to elevate said movable supports so that the part of the pile sustained thereby is raised out of operative relation to said picker, and to position said actuating member out of the aforesaid path of the picker.

28. The combination, in an envelop machine, of stationary supports for a pile of blanks, suitably-journaled horizontal rock-shafts, hangers loosely suspended from such shafts, a rock-shaft journaled in such hangers, blank-supporting fingers mounted on said last-mentioned shaft, an operating arm, for the swinging members, also mounted on said last-mentioned shaft, a short rock-shaft, means to actuate the latter, connections between one of the first-mentioned shafts and the shaft journaled in the hangers, and connections between one of the first-mentioned shafts and said short shaft, whereby said fingers and said operating arm are raised or lowered according to the direction in which said short shaft is actuated.

29. The combination, in an envelop machine, with stationary supports for a pile of blanks, suitably-journaled horizontal rock-shafts, hangers loosely suspended from such shafts, a rock-shaft journaled in such hangers, blank supporting fingers mounted on said last-mentioned shaft, an operating arm, for the swinging members, also mounted on said last-mentioned shaft, a short rock-shaft, connections between one of the first-mentioned shafts and the shaft journaled in the hangers, and connections between one of the first-mentioned shafts and said short shaft, whereby said fingers and said operating arm are raised or lowered according to the direction in which said short shaft is actuated, of a suitably-journaled vertical rock-shaft in operative engagement with the short shaft, and means to limit the movement of said vertical shaft.

30. The combination, in an envelop machine, with stationary supports for a pile of blanks, suitably-journaled horizontal rock-shafts, swinging members including hangers loosely suspended from such shafts, a rock-shaft journaled in such hangers, blank-supporting fingers mounted on said last-mentioned shaft, and an operating arm, for said swinging members, also mounted on said last-mentioned shaft, a short rock-shaft, connections between one of the first-mentioned shafts and the shaft journaled in the hangers, and connections between one of the first-mentioned shafts and said short shaft, whereby said fingers and said operating arm are raised or lowered according to the direction in which said short shaft is actuated, of a suitably-journaled vertical rock-shaft in operative engagement with the short shaft, and means to limit the movement of said vertical shaft and hold it against accidental rotation or displacement.

31. The combination, in an envelop machine, of a reciprocating revoluble picker, a pair of suitably-mounted arms, a gum-transfer roller carried by such arms, cam-actuated means adapted to operate said arms and thrust said gum-transfer roller temporarily into the path of said picker, and means to receive the thrust of such arms and positively limit the pressure of such roller on the picker.

32. The combination, in an envelop machine, of a reciprocating revoluble picker, a pair of suitably-mounted arms, a gum-transfer roller carried by such arms, cam-actuated means adapted to operate said arms and thrust said gum-transfer roller into the path of said picker, and adjustable means to limit the travel of said roller toward the picker and the amount of pressure exerted by the roller on the picker.

33. The combination, in an envelop machine, with a reciprocating revoluble picker-roller and shaft therefor, such picker roller being provided with a gum-receiving member, and friction-disks on such shaft, of a pair of suitably-mounted arms, a shaft journaled in such arms, a gum-transfer roller and friction-disks mounted on said last-mentioned shaft, and cam-actuated means adapted to operate said arms and thrust said gum-transfer roller temporarily into the path of said gum-receiving member and the disks on the gum-transfer-roller shaft into contact with the disks on the picker-roller shaft, whereby motion is imparted from the picker-roller shaft to the gum-transfer roller and the thrust of said arms limited.

34. The combination, in an envelop machine, with a reciprocating revoluble picker, a pair of suitably-mounted arms, and a gum-transfer roller carried by such arms, of cam-actuated mechanism adapted to operate said arms and thrust said gum-transfer roller temporarily into the path of said picker, means to receive the thrust of such arms and positively limit the pressure of such roller on the picker, and means in said cam-actuated mechanism capable of yielding under the impact of said thrust-receiving means.

35. The combination, in an envelop machine, with a reciprocating revoluble picker the reciprocating movement of which is in a straight line, of a shaft, bearing eye-studs for such shaft, lugs in which such eye-studs are adjustably mounted, a pair of arms mounted on said shaft, a gum-transfer roller carried by such arms, and cam-actuated mechanism adapted to operate said arms and thrust said roller temporarily into the path of said picker, such mechanism being independent of said picker.

GEORGE P. TAYLOR.

Witnesses:
F. A. CUTTER,
A. C. FAIRBANKS.